US010949477B2

(12) United States Patent
Jiang

(10) Patent No.: US 10,949,477 B2
(45) Date of Patent: Mar. 16, 2021

(54) SERVICE RECOMMENDATION METHOD AND APPARATUS WITH INTELLIGENT ASSISTANT

(71) Applicant: Huawei Technologies Co., Ltd., Shenzhen (CN)

(72) Inventor: Nan Jiang, Reading (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 363 days.

(21) Appl. No.: 14/981,247

(22) Filed: Dec. 28, 2015

(65) Prior Publication Data

US 2016/0132605 A1 May 12, 2016

Related U.S. Application Data

(63) Continuation of application No. PCT/CN2015/072537, filed on Feb. 9, 2015.

(30) Foreign Application Priority Data

Jul. 11, 2014 (CN) .......................... 201410329401.1

(51) Int. Cl.
*G06F 16/2455* (2019.01)
*G06F 16/9535* (2019.01)
(Continued)

(52) U.S. Cl.
CPC .......... *G06F 16/9535* (2019.01); *G06F 16/00* (2019.01); *G06F 16/2457* (2019.01);
(Continued)

(58) Field of Classification Search
CPC ......... G06F 17/30867; G06F 17/30522; G06F 16/9535; G06F 16/24552; G06F 16/24565;
(Continued)

(56) References Cited

U.S. PATENT DOCUMENTS 6,072,869 A * 6/2000 Becker .................... H04M 1/82
379/350
8,635,083 B1 * 1/2014 Casu ...................... G06Q 30/02
705/2
(Continued)

FOREIGN PATENT DOCUMENTS

CN 101414296 A 4/2009
CN 102255907 A 11/2011
(Continued)

OTHER PUBLICATIONS

Hao, Y., et al., "Web services discovery and rank: An information retrieval approach," Future Generation Computer Systems, Elsevier Science Publisher, vol. 26, No. 8, Apr. 19, 2010, pp. 1053-1062.
(Continued)

*Primary Examiner* — Boris Gorney
*Assistant Examiner* — Vaishali Shah
(74) *Attorney, Agent, or Firm* — Conley Rose, P.C.

(57) ABSTRACT

A service recommendation method includes, when a user of a terminal requests a first service from an intelligent assistant, selecting, according to a name of the first service and by using a pre-established service relationship model, a potential service with a degree of relevance to the first service that meets a preset condition from multiple services that the intelligent assistant can provide, where names of the multiple services and degrees of relevance of the multiple services to each other are recorded in the service relationship model; and recommending the potential service to the user.

20 Claims, 9 Drawing Sheets

(51) Int. Cl.
*G06F 16/2457* (2019.01)
*G06F 16/00* (2019.01)
*H04L 29/08* (2006.01)

(52) U.S. Cl.
CPC .. *G06F 16/24552* (2019.01); *G06F 16/24565* (2019.01); *G06F 16/24578* (2019.01); *H04L 67/16* (2013.01); *H04L 67/2842* (2013.01)

(58) Field of Classification Search
CPC ............... G06F 16/24578; G06F 16/00; G06F 16/2457; H04L 67/16; H04L 67/2842
See application file for complete search history.

(56) References Cited

U.S. PATENT DOCUMENTS

| | | | |
|---|---|---|---|
| 2002/0184374 A1* | 12/2002 | Morikawa | G06F 9/50 709/229 |
| 2009/0271350 A1 | 10/2009 | Feng et al. | |
| 2010/0017388 A1* | 1/2010 | Glover | G06F 16/9535 707/E17.001 |
| 2010/0017396 A1* | 1/2010 | Chatani | G06F 17/30994 707/E17.014 |
| 2010/0228574 A1* | 9/2010 | Mundinger | G06Q 10/047 705/4 |
| 2012/0143662 A1 | 6/2012 | Heath | |
| 2012/0284365 A1 | 11/2012 | Ma et al. | |
| 2013/0066823 A1* | 3/2013 | Sweeney | G06N 5/02 706/50 |
| 2013/0111487 A1 | 5/2013 | Cheyer et al. | |
| 2013/0262165 A1 | 10/2013 | Gao | |
| 2013/0275164 A1 | 10/2013 | Gruber et al. | |
| 2013/0326067 A1* | 12/2013 | Smith, II | H04L 67/16 709/226 |
| 2015/0127952 A1* | 5/2015 | Bowman | G06F 21/602 713/189 |
| 2015/0156061 A1* | 6/2015 | Saxena | H04W 4/50 715/733 |

FOREIGN PATENT DOCUMENTS

| | | | | |
|---|---|---|---|---|
| CN | 103544220 | * | 1/2014 | ............ G06F 17/30 |
| CN | 103544220 A | | 1/2014 | |
| CN | 103593434 | * | 2/2014 | ............ G06F 17/30 |
| CN | 103593434 A | | 2/2014 | |
| CN | 103617075 A | | 3/2014 | |
| CN | 103617547 A | | 3/2014 | |
| WO | 2010028589 A1 | | 3/2010 | |
| WO | 2011088053 A2 | | 7/2011 | |
| WO | 2011120247 A1 | | 10/2011 | |

OTHER PUBLICATIONS

Foreign Communication From a Counterpart Application, European Application No. 15810686.4, Extended European Search Report dated Jul. 27, 2016, 10 pages.
Partial English Translation and Abstract of Chinese Patent Application No. CN103544220, Dec. 26, 2015, 5 pages.
Partial English Translation and Abstract of Chinese Patent Application No. CN103593434, Dec. 26, 2015, 8 pages.
Foreign Communication From a Counterpart Application No. PCT/CN2015/072537, International Search Report dated May 13, 2015, 7 pages.
Foreign Communication From a Counterpart Application No. PCT/CN2015/072537, Written Opinion dated May 13, 2015, 5 pages.
Machine Translation and Abstract of Chinese Publication No. CN102255907, Nov. 23, 2011, 8 pages.
Xiner, L., "The heart has a "consonance" a little pass—big talk Ling language assistant," Junior Computer World, vol. 2013, No. 9, Sep. 1, 2013, 3 pages.
English Translation of Xiner, L., "The heart has a "consonance" a little pass—big talk Ling language assistant," Junior Computer World, vol. 2013, No. 9, Sep. 1, 2013, 2 pages.
Foreign Communication From a Counterpart Application, Chinese Application No. 201410329401.1, Chinese Office Action dated May 3, 2018, 8 pages.
Foreign Communication From a Counterpart Application, Chinese Application No. 201410329401.1, Chinese Search Report dated Apr. 21, 2018, 2 pages.

* cited by examiner

SERVICE RECOMMENDATION METHOD AND APPARATUS WITH INTELLIGENT ASSISTANT

CROSS-REFERENCE TO RELATED APPLICATIONS

This application is a continuation application of International Application No. PCT/CN2015/072537, filed on Feb. 9, 2015, which claims priority to Chinese Patent Application No. 201410329401.1, filed on Jul. 11, 2014, both of which are incorporated herein by reference in their entireties.

TECHNICAL FIELD

Embodiments of the present disclosure relate to the communications field, and more specifically, to a service recommendation method and an apparatus with an intelligent assistant.

BACKGROUND

In the prior art, an intelligent assistant is widely applied on a terminal, such as Siri of the Apple® Inc., Google Now® of the Google®, Sogou Voice Assistant of the Sogou Inc., or iFLYTEK Voice Touch of the iFLYTEK CO., LTD.

The intelligent assistant can acquire information entered by a user, such as text, speech, an image, and parse out an intention of the user. Then, the intelligent assistant invokes a local application or a network-side application, such as an application (APP) or an application programming interface (API), to acquire a request result, and return the request result to the user. For example, the user enters "weather for tomorrow" by using a microphone on a terminal. The intelligent assistant converts speech into text by using a speech recognition technology; understands, by using a natural language processing technology, that the intention of the user is "querying weather", and that corresponding time is "tomorrow"; generates a corresponding instruction, acquires a weather result from a third-party application, and displays the result on a screen of the terminal; and in addition, broadcasts the result by using a speech generation technology.

In the prior art, when a user requests an intelligent assistant to provide a service, another potential service requirement still exists. For example, after the user requests the intelligent assistant to provide a navigation service, there may be further a service requirement of acquiring a traffic condition on a navigation path in real time. Alternatively, after the user requests the intelligent assistant to provide a movie ticket reservation service, there is further a service requirement of setting a reminder and sending a short message service message to notify a friend. In the prior art, after requesting a service from the intelligent assistant, the user still needs to actively and repeatedly request a potential service related to the service from the intelligent assistant, and an operation is complex.

SUMMARY

Embodiments of the present disclosure provide a service recommendation method and an apparatus with an intelligent assistant, to facilitate an operation of a user.

According to a first aspect, a service recommendation method is provided, including, when a user of a terminal requests a first service from an intelligent assistant, selecting, according to a name of the first service and by using a pre-established service relationship model, a potential service with a degree of relevance to the first service that meets a preset condition from multiple services that the intelligent assistant can provide, where names of the multiple services and degrees of relevance of the multiple services to each other are recorded in the service relationship model; and recommending the potential service to the user.

With reference to the first aspect, in one implementation manner of the first aspect, the preset condition is a threshold for a relevance degree, and the selecting, according to a name of the first service and by using a pre-established service relationship model, a potential service with a degree of relevance to the first service that meets a preset condition from multiple services that the intelligent assistant can provide includes determining degrees of relevance of all the multiple services to the first service according to the name of the first service and by using the service relationship model; and determining, among the multiple services, a service with a degree of relevance to the first service that meets the threshold as the potential service.

With reference to the first aspect or any one of the foregoing implementation manners, in another implementation manner of the first aspect, the preset condition is a threshold for a quantity of services recommended to the user, and the selecting, according to a name of the first service and by using a pre-established service relationship model, a potential service with a degree of relevance to the first service that meets a preset condition from multiple services that the intelligent assistant can provide includes determining degrees of relevance of all the multiple services to the first service according to the name of the first service and by using the service relationship model; and ranking the degrees of relevance of the multiple services to the first service, to determine, among the multiple services, a service whose ranking falls within the threshold as the potential service.

With reference to the first aspect or any one of the foregoing implementation manners, in another implementation manner of the first aspect, the recommending the potential service to the user includes recommending, according to ranking of degrees of relevance of all the potential services to the first service, a service with a relatively high degree of relevance to the first service among the potential services to the user.

With reference to the first aspect or any one of the foregoing implementation manners, in another implementation manner of the first aspect, the services that the intelligent assistant can provide include a second service, degrees of relevance between the first service and the second service in different relevance conditions are recorded in the service relationship model, and the selecting, according to a name of the first service and by using a pre-established service relationship model, a potential service with a degree of relevance to the first service that meets a preset condition from multiple services that the intelligent assistant can provide includes, according to the name of the first service and an environmental condition for the user when requesting the first service, and by using the service relationship model, determining a relevance degree corresponding to a relevance condition among the different relevance conditions that is met in the environmental condition as a degree of relevance between the first service and the second service; and when the degree of relevance between the first service and the second service meets the preset condition, determining the second service as one of the potential services.

With reference to the first aspect or any one of the foregoing implementation manners, in another implementation manner of the first aspect, a service parameter of each of the multiple services that the intelligent assistant can provide is further recorded in the service relationship model, where the service parameter is a parameter to which a value needs to be assigned when a third-party application provides a corresponding service; and the method further includes extracting, from the service relationship model, service parameters of all services including the first service and the potential service; and allocating, in a session cache, a corresponding session in a session cache to each of all the services, where a service parameter of a corresponding service is contained in content of the session, and sessions in the session cache share a value of a respectively stored service parameter with each other.

With reference to the first aspect or any one of the foregoing implementation manners, in another implementation manner of the first aspect, the potential service includes a third service, a trigger condition of the third service is further recorded in the service relationship model, and the recommending the potential service to the user includes, after an instruction for requesting the third-party application to provide the third service is generated, detecting whether the trigger condition is met; and when the trigger condition is not met, temporarily storing the instruction in a cache; or when the trigger condition is met, sending the instruction to the third service.

With reference to the first aspect or any one of the foregoing implementation manners, in another implementation manner of the first aspect, a degree of relevance between any two services among the multiple services that the intelligent assistant can provide is used to indicate, after the user requests one of the two services, a probability of requesting the other service.

With reference to the first aspect or any one of the foregoing implementation manners, in another implementation manner of the first aspect, the method is executed by a server on a network side, and the terminal is a terminal served by the server.

With reference to the first aspect or any one of the foregoing implementation manners, in another implementation manner of the first aspect, the method is executed by the terminal.

According to a second aspect, an apparatus with an intelligent assistant is provided, including a selecting module configured to, when a user of a terminal requests a first service from an intelligent assistant, select, according to a name of the first service and by using a pre-established service relationship model, a potential service with a degree of relevance to the first service that meets a preset condition from multiple services that the intelligent assistant can provide, where names of the multiple services and degrees of relevance of the multiple services to each other are recorded in the service relationship model; and a recommending module configured to recommend the potential service selected by the selecting module to the user.

With reference to the second aspect, in one implementation manner of the second aspect, the preset condition is a threshold for a relevance degree, and the selecting module is further configured to determine degrees of relevance of all the multiple services to the first service according to the name of the first service and by using the service relationship model; and determine, among the multiple services, a service with a degree of relevance to the first service that meets the threshold as the potential service.

With reference to the second aspect or any one of the foregoing implementation manners, in another implementation manner of the second aspect, the preset condition is a threshold for a quantity of services recommended to the user, and the selecting module is further configured to determine degrees of relevance of all the multiple services to the first service according to the name of the first service and by using the service relationship model; and rank the degrees of relevance of the multiple services to the first service, to determine, among the multiple services, a service whose ranking falls within the threshold as the potential service.

With reference to the second aspect or any one of the foregoing implementation manners, in another implementation manner of the second aspect, the recommending module is further configured to recommend, according to ranking of degrees of relevance of all the potential services to the first service, a service with a relatively high degree of relevance to the first service among the potential services to the user.

With reference to the second aspect or any one of the foregoing implementation manners, in another implementation manner of the second aspect, the services that the intelligent assistant can provide include a second service, degrees of relevance between the first service and the second service in different relevance conditions are recorded in the service relationship model, and the selecting module is further configured to, according to the name of the first service and an environmental condition for the user when requesting the first service, and by using the service relationship model, determine a relevance degree corresponding to a relevance condition among the different relevance conditions that is met in the environmental condition as a degree of relevance between the first service and the second service; and when the degree of relevance between the first service and the second service meets the preset condition, determine the second service as one of the potential services.

With reference to the second aspect or any one of the foregoing implementation manners, in another implementation manner of the second aspect, a service parameter of each of the multiple services that the intelligent assistant can provide is further recorded in the service relationship model, where the service parameter is a parameter to which a value needs to be assigned when a third-party application provides a corresponding service; and the apparatus further includes an extracting module configured to extract, from the service relationship model, service parameters of all services including the first service and the potential service; and an allocating module configured to allocate, in a session cache, a corresponding session in a session cache to each of all the services, where a service parameter of a corresponding service is contained in content of the session, and sessions in the session cache share a value of a respectively stored service parameter with each other.

With reference to the second aspect or any one of the foregoing implementation manners, in another implementation manner of the second aspect, the potential service includes a third service, a trigger condition of the third service is further recorded in the service relationship model, and the recommending module is further configured to, after an instruction for requesting the third-party application to provide the third service is generated, detect whether the trigger condition is met; and when the trigger condition is not met, buffer the instruction in a cache; or when the trigger condition is met, send the instruction to the third service.

With reference to the second aspect or any one of the foregoing implementation manners, in another implementation manner of the second aspect, a degree of relevance between any two services among the multiple services that the intelligent assistant can provide is used to indicate, after the user requests one of the two services, a probability of requesting the other service.

With reference to the second aspect or any one of the foregoing implementation manners, in another implementation manner of the second aspect, the apparatus is a server on a network side, and the terminal is a terminal served by the server.

With reference to the second aspect or any one of the foregoing implementation manners, in another implementation manner of the second aspect, the apparatus is the terminal.

In the embodiments of the present disclosure, after a user requests a first service, a potential service with a degree of relevance to the first service that meets a preset condition is selected, by using a pre-stored service relationship model, from services supported by an intelligent assistant, and these potential services are recommended to the user, so that after requesting a service, the user does not need to actively and repeatedly request a subsequent service related to the service from the intelligent assistant, thereby facilitating use for the user.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

First, for ease of understanding, an exemplary diagram of an application scenario of an embodiment of the present disclosure is generally described with reference to FIG. 1.

Figure 1:
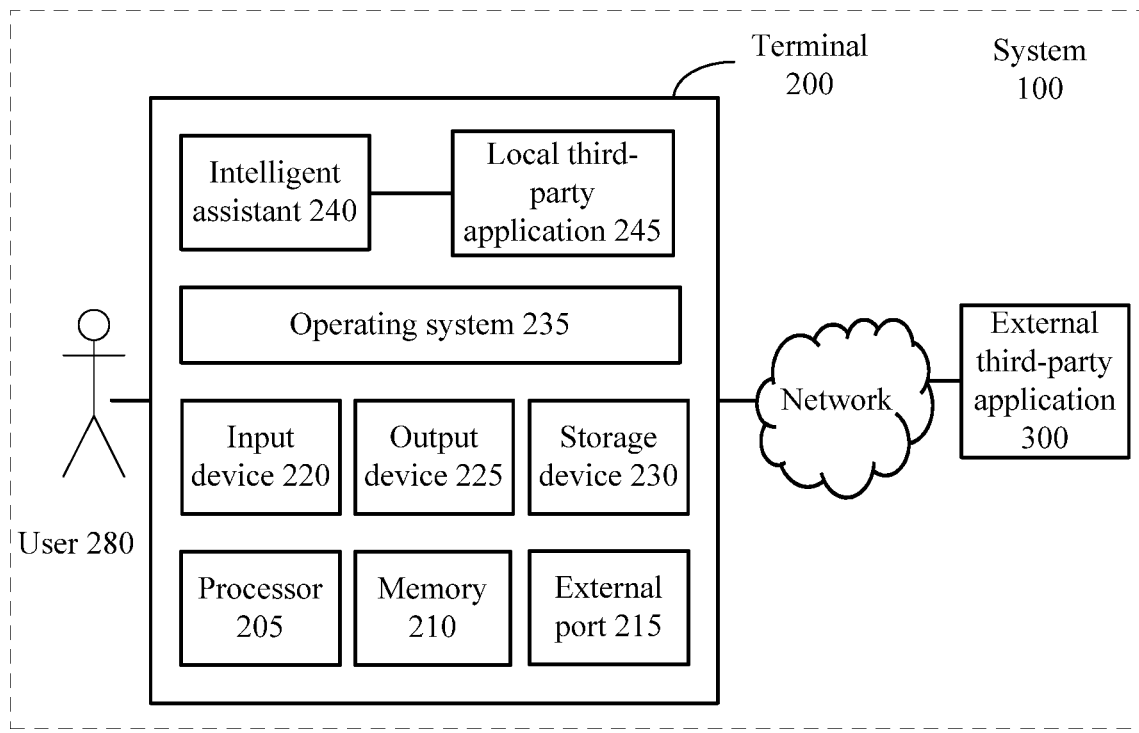
FIG. 1 is an exemplary diagram of an application scenario of an embodiment of the present disclosure.

As shown in FIG. 1, a system 100 includes a terminal 200, a user 280, and an external third-party application 300. The terminal 200 and the external third-party application 300 may communicate by using a network. An intelligent assistant 240 may be located in the terminal 200, and may invoke a local third-party application 245 or invoke the external third-party application 300 to meet a service requested by the user 280. The intelligent assistant 240 may be but is not limited to software, hardware, or an apparatus combining software and hardware. The intelligent assistant 240 may be but is not limited to being deployed in various computing devices, such as a personal computer (PC), an intelligent terminal, a mobile phone, a tablet computer, a portable wearable device, and another embedded device; or may be but is not limited to being deployed in an executable environment unrelated to hardware, such as a browser or an application program. Other modules or components of the terminal 200 are described as follows:

A processor 205 may execute an instruction generated when the terminal 200 runs. The processor 205 is for example, but not limited to a central processing unit (CPU), a graphics processing unit (GPU), a field programmable gate array (FPGA), a digital signal processor (DSP), or a combination of the foregoing processors.

A memory 210 may buffer data and an instruction sequence that are required for running of the processor 205. The memory 210 is for example, but not limited to a read-only memory (ROM), a random-access memory (RAM), a flash memory, or a combination of the foregoing hardware.

An external port 215 may interact with an external device or a network. The external port 215 is for example, but not limited to a universal serial bus (USB), a serial port, a parallel port, an Ethernet interface, a digital subscriber line (DSL) interface, a radio frequency (RF) interface, a peripheral component interconnect (PCI), Bluetooth, or a combination of the foregoing interfaces.

An input device 220 may receive an input of the user 280, and translates the input to a language that the system can understand. The input device 220 is for example, but not limited to a keyboard, a mouse, a touchscreen, a device key, a microphone, various sensors (such as a global positioning system (GPS), a level sensor, and a gravity sensor), or a combination of the foregoing hardware.

An output device 225 may display a processing result of the system. The output device 225 is for example, but not limited to a screen, a speaker, a headset, a printer, an oscillator, or a combination of the foregoing hardware.

A storage device 230 may store a system program and data. The storage device 230 is for example, but not limited to a ROM, a flash memory, a hard disk, a compact disc read-only memory (CD-ROM), or a combination of the foregoing hardware.

In addition, the user 280 may be but is not limited to a user who directly operates the intelligent assistant 240, or an integrated program, process, device, or the like that integrates the intelligent assistant 240 and indirectly provides a service to the user.

It should be noted that, in FIG. 1, a main function of an intelligent assistant is integrated into the terminal 200, and is completed by the intelligent assistant 240, but this embodiment of the present disclosure is not limited thereto. For example, the main function of the intelligent assistant may be further integrated into a server, where a client corresponding to the server is mainly used to collect information entered by the user. For details, refer to FIG. 2.

Figure 2:
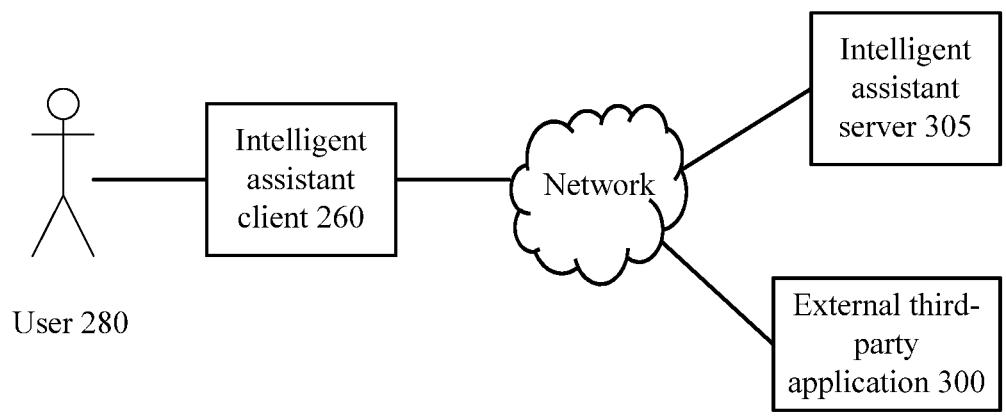
FIG. 2 is an exemplary diagram of another application scenario of an embodiment of the present disclosure.

FIG. 2 is an exemplary diagram of another scenario of an embodiment of the present disclosure. In FIG. 2, a main function of an intelligent assistant is implemented by an intelligent assistant server 305 on a network side, and an intelligent assistant client 260 on a terminal side is mainly responsible for collecting information entered by a user 280, and keeps communicating with the intelligent assistant server 305, to implement information interaction between the user 280 and the server 305. The server 305 may be hardware and/or software that processes a request from the client 260, generates a result, and returns the result to the client 260, and includes a database that needs to be used, and the like. An external third-party application 300 may be a provider of a service that meets the request from the client 260. The external third-party application 300 is for example, but not limited to a file or a database that provides a query result, or a program API or a network API that provides invoking. The user 280 may be but is not limited to a user who directly operates the intelligent assistant client 260, or an integrated program, process, device, or the like that uses the client 260 by means of integration and indirectly provides a service to the user.

The foregoing describes a system architectural diagram according to an embodiment of the present disclosure, and the following describes in detail a service recommendation method according to an embodiment of the present disclosure. It should be understood that the method may be executed by the terminal 200 in FIG. 1 or the server 305 in FIG. 2.

Figure 3:
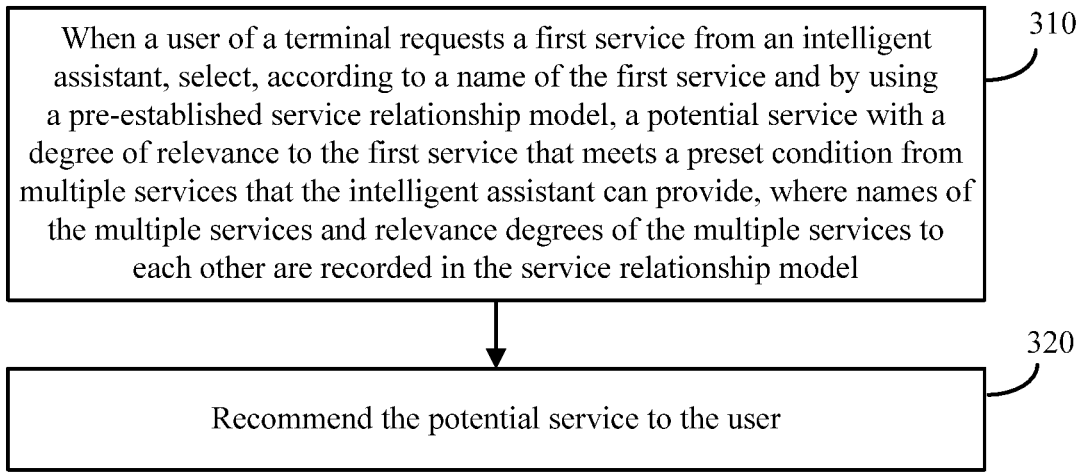
FIG. 3 is a schematic flowchart of a service recommendation method according to an embodiment of the present disclosure.

FIG. 3 is a schematic flowchart of a service recommendation method according to an embodiment of the present disclosure. The method in FIG. 3 includes:

310. When a user of a terminal requests a first service from an intelligent assistant, select, according to a name of the first service and by using a pre-established service relationship model, a potential service with a degree of relevance to the first service that meets a preset condition from multiple services that the intelligent assistant can provide, where names of the multiple services and degrees of relevance of the multiple services to each other are recorded in the service relationship model.

It should be noted that, the first service may be a service that the user actively requests, or may be a potential service selected according to a previous request of the user and by using the pre-established service relationship model. For example, the user actively requests a restaurant reservation service, and the restaurant reservation service and a coupon providing service are selected as the foregoing potential service by using the pre-established service relationship model. Then, the foregoing first service may be the restaurant reservation service, or may be the coupon providing service. In other words, when the first service is the restaurant reservation service, step 310 describes a process during which the user explores a potential service of the first service after actively requesting the first service. When the first service is the coupon providing service, step 310 describes a process during which the user further explores a potential service requirement of the user based on the potential service after accepting a potential service that the terminal previously recommended.

It should be further noted that the foregoing preset condition may have multiple forms, and may be a preset threshold. For example, the threshold may be a threshold for a relevance degree. That is, a service supported by the intelligent assistant can be recommended to the user only when a degree of relevance of the service to the first service is greater than or equal to the threshold. In this way, accuracy, that is, a degree of matching to a potential requirement of the user, of a service recommended to the user can be ensured. Alternatively, the threshold may be a threshold for a quantity of recommended services. That is, a service with a degree of relevance to the first service that ranks within the threshold among the multiple services supported by the intelligent assistant is recommended to the user. In this way, unwanted services can be filtered out. A specific value of the threshold may be set by considering a size of a display area of a screen of a mobile phone, a quantity that can be accepted by the user, a commercial consideration, or the like. In addition, the foregoing preset condition may further be another determining logic except the threshold. For example, when only one service or a limited quantity of services are related to the first service, the one service or the limited quantity of services are directly recommended to the user regardless of a degree of relevance of the one service or the limited quantity of services to the first service. Certainly, the foregoing preset condition may further be a combination of the foregoing manners, and details are not described herein.

320. Recommend the potential service to the user.

The recommending the potential service to the user herein may include querying the user whether to provide the potential service, and when the user agrees to accept the potential service, executing a subsequent procedure of requesting a third-party application to provide the potential service. Alternatively, the recommending the potential service to the user herein may further include directly providing the potential service to the user without a need of querying the user. Certainly, the recommending the potential service to the user herein may further be a combination of the foregoing cases.

In this embodiment of the present disclosure, after a user requests a first service, a potential service with a degree of relevance to the first service that meets a preset condition is selected, by using a pre-established service relationship model, from services supported by an intelligent assistant, and these potential services are recommended to the user, so that after requesting a service, the user does not need to actively and repeatedly request a subsequent service related to the service from the intelligent assistant, thereby facilitating use for the user.

Optionally, as an embodiment, the preset condition is a threshold for a relevance degree, and step 310 may include determining degrees of relevance of all the multiple services to the first service according to the name of the first service and by using the service relationship model; and determining, among the multiple services, a service with a degree of relevance to the first service that meets the threshold as the potential service.

For example, a degree of relevance between services is represented by using values 0 to 5, and a larger value indicates a higher relevance degree. The foregoing threshold may be set to 3, that is, a service is recommended to the user only when a degree of relevance of the service to the first service is greater than or equal to 3.

Optionally, as an embodiment, the preset condition is a threshold for a quantity of services recommended to the user, and step 310 may include determining degrees of relevance of all the multiple services to the first service according to the name of the first service and by using the service relationship model; and ranking the degrees of relevance of the multiple services to the first service, to determine, among the multiple services, a service whose ranking falls within the threshold as the potential service.

For example, the foregoing threshold is set to 10, that is, according to ranking of the degrees of relevance of all the multiple services to the first service, a service whose ranking falls within the top 10 is selected and recommended to the user.

Optionally, as an embodiment, the recommending the potential service to the user includes recommending, according to ranking of degrees of relevance of all the potential services to the first service, a service with a relatively high degree of relevance to the first service among the potential services to the user.

In this embodiment of the present disclosure, a service with a relatively high relevance degree is recommended to the user according to the degrees of relevance of all the services to the first service, so that a potential service that the user most needs can be met, and user experience is improved.

Before step 310, the method in FIG. 1 may further include but is not limited to first, collecting, converting, and correcting request information of the user; and then parsing the request information of the user to acquire information, such as a service name and a service parameter that are of the first service.

A trigger condition may be set for collecting the request information. In other words, when the trigger condition is triggered, it indicates that the user is going to enter the request information, and the request information of the user starts to be collected since then. The foregoing trigger condition may be but is not limited to the following: the intelligent assistant is enabled, or the user clicks a key on a device in which the intelligent assistant is located, or the user taps an icon on a touchscreen or clicks an icon by using a mouse, or the user performs a sliding along a track, or the user makes a gesture or an action in front of a camera, or the user enters particular speech by using a microphone, or the user enters a particular instruction on a program or a web page, or the user sends particular information (such as text information, speech information, or image information) to a phone number, an Email address, an IP address, or a URL address by using a short message service message, an email, or the like, or the user dials a particular phone number, or the user logs in to a particular website, or the user accesses a web page.

In addition, a manner of collecting the request information may include but is not limited to a direct manner, an indirect manner, or a combination of the two manners. The direct manner may include but is not limited to a keyboard input, a speech input, or an input in a manner of selecting by using a user interface (UI) interface. Content collected in the direct manner may be but is not limited to text, speech, an image, an operation instruction, or the like. The indirect manner may include but is not limited to date and clock information (for example, but not limited to a current date, time, or time zone), location information (for example, but not limited to a GPS information, a country, or a city), information (for example, but not limited to information such as acceleration, a magnetic force, a direction, a gyroscope, light sensing, pressure, a temperature, face sensing, gravity, or a rotating vector) generated by using a sensor, or a combination of the foregoing manners. In addition, the request information may also be collected by another device or program in the foregoing manners, and is then provided to the intelligent assistant by using a network.

In addition, converting the request information may specifically refer to but is not limited to converting or standardizing request content generated in multiple manners to content that the intelligent assistant can process, which is, for example, but not limited to converting or standardizing text inputs of multiple formats to text of a particular format, converting the speech input to text of a particular format by using an automatic speech recognition (ASR) technology, converting an image input to a file stream of a particular format, converting or standardizing the date and clock information to text of a particular format, or converting or standardizing the information generated by using the sensor to information of a particular format.

In addition, correcting the request information may specifically refer to but is not limited to converting an error in the request information entered by the user to standard text. The error includes but is not limited to an error generated in speech recognition, an error generated by an incorrect user input, an error that the user does not enter a complete word, or the like.

Further, the request information may be parsed by using a natural language understanding technology, which includes but is not limited to word segmentation, used to segment a complete and coherent sentence entered by the user into independent words; short sentence/phrase segmentation, used to segment the complete and coherent sentence entered by the user into independent phrases or expressions; part-of-speech tagging, used to recognize part-of-speech of words/phrases/short sentences obtained after a user input is segmented; named entity recognition, used to recognize particular categories of the words/phrases/short sentences obtained after the user input is segmented; syntactic analyzing, used to determine relationships between the words/phrases/short sentences obtained after the user input is segmented, and form a sentence structure; semantic matching, used to paraphrase, according to a semantic meaning of the user input and by using a particular word/phrase/expression/sentence, a particular word/phrase/short sentence/sentence that is originally entered; co-reference disambiguation, used to replace, according to the semantic meaning of the user input, a pronoun that occurs in the sentence entered by the user with a particular word/phrase/short sentence; omission reply, used to complete, according to a context and the semantic meaning of the user input, content omitted in a current input; input correcting, used to correct an input error in the user input according to the semantic meaning of the user input; and mode matching, used to match the user input according to a predefined mode, and extract related information from a result of the matching.

Certainly, the request information may be parsed by using any combination of the foregoing manners.

The request information may be parsed by using a situation awareness technology, which includes but is not limited to acquiring time and date information by using a device clock; acquiring information, such as a location, an administrative area, or a time zone, by using a device GPS and radio signal information; and acquiring corresponding information (for example, but not limited to acceleration, a magnetic force, a direction, a gyroscope, light sensing, pressure, a temperature, face sensing, gravity, or a rotating vector) by using a sensor.

In addition, the request information may be parsed by using a pre-stored library required for understanding the user input, where the library includes but is not limited to a lexicon, a domain entity database, or the like, and may be used to parse the user input.

The method in FIG. 1 may further include selecting a corresponding third-party application according to related information of the first service, such as the service name and service parameter that are of the first service; invoking an API of the third-party application; passing the service parameter; and acquiring, filtering, merging, and ranking results returned by the third-party application. When returning of the service results is abnormal, the user may be directed to enter the request information again, or to adjust the request information.

The method in FIG. 1 may further include feeding back the service results fed back by the third-party application to the user, and a form of the service results includes but is not limited to text, an image, speech, a web page, a video, audio file, or the like. An output module may use but is not limited to using a text to speech (TTS) technology to convert the text to a speech output, or may organize the text, the image, the audio, the video, and the like into a rich text output. For example, "The following results are searched out for you . . ." may be presented to the user.

In step 310, related information, such as a concept, an attribute, logic, and relationships of services that can be provided may be recorded in the service relationship model, and the related information includes but is not limited to a service name, a service parameter (that is, a parameter that needs to be provided for acquiring a service result), and a degree of relevance between different services.

The service name indicates meeting a type of request of the user, and is for example, but not limited to "restaurant reservation", "restaurant searching", "medical treatment", "navigation", or "weather querying".

The service parameter indicates providing a particular service, and a source of the service parameter includes but is not limited to a result obtained by collecting, converting, correcting, and parsing the request information in the foregoing description. The service parameter includes a mandatory parameter and an optional parameter. The mandatory parameter may indicate information that must be provided to the third-party application when the intelligent assistant schedules a service. If the mandatory parameter, for example, but not limited to a service parameter "restaurant name", "dining time", or "quantity of people dining" of "restaurant reservation", is not provided, the third-party application cannot return results. The optional parameter may indicate information that may not be provided to the third-party application when the intelligent assistant schedules a service, but information that may help filter and rank the results returned by a third-party application, such as a parameter "whether to have a compartment" or "whether to smoke" of the service "restaurant reservation", is provided. The service parameter is related to a particular service name. A parameter corresponding to a service name may not be a parameter of another service name; a mandatory parameter of a service may also be an optional parameter of another service name; and the reverse is also true.

A degree of relevance between services may indicate a degree of relevance between a particular service and another service. In other words, relevance between two services may indicate, after the user selects one service, a possibility or probability of selecting the other service by the user. A degree of relevance between services is a basis of recommending a service. A degree of relevance between two services may be indicated by using 0 and 1, where 0 indicates that the services are unrelated, and 1 indicates that the services are related; or may be indicated by using a value representing a degree, such as a value range 0 to 5, where 0 indicates the services are completely unrelated, and starting from 0, a larger value indicates a higher relevance degree. Certainly, a degree of relevance between the first service and a second service may also be indicated by using a variable instead of a fixed value, where a value of the variable is related to an environmental condition for the user when requesting the first service, which is, for example, but not limited to the following: the service "restaurant reservation" has relatively high relevance to a service "taxi booking" when the user is relatively far away from a restaurant; otherwise, the relevance is relatively low.

A manner of constructing the service relationship model includes but is not limited to specifying according to a conventional concept, logic, and relationship of each service in real life; specifying according to the API of the third-party application; specifying by learning usage rules of all users; specifying by learning a usage rule of a particular type of user; specifying by learning a usage rule of a particular user; or a combination of the foregoing manners.

Step 310 may include acquiring degrees of relevance of the first service to other services by using the name of the first service and the service relationship model, and selecting a service with a degree of relevance that meets the preset condition as the potential service. A manner of selecting the potential service may include, if a relevance condition of the first service exists in the service relationship model, determining whether the relevance condition is met, and calculating by using a corresponding relevance degree indicator; if the relevance degree is indicated by using binary relevance, directly selecting a service whose indicator is "related"; if the relevance degree is indicated by using probability relevance, selecting a service whose indicator is higher than a particular threshold; if the relevance degree is indicated by using multiple indicators, calculating by using a particular decoding algorithm combining the multiple indicators, and selecting a service whose result indicates "related"; or a combination of the foregoing manners.

Optionally, as an embodiment, the services that the intelligent assistant can provide include a second service, degrees of relevance between the first service and the second service in different relevance conditions are recorded in the service relationship model, and step 310 may include, according to the name of the first service and an environmental condition for the user when requesting the first service, and by using the service relationship model, determining a relevance degree corresponding to a relevance condition among the different relevance conditions that is met in the environmental condition as a degree of relevance between the first service and the second service; and when the degree of relevance between the first service and the second service meets the preset condition, determining the second service as one of the potential services.

In this embodiment of the present disclosure, degrees of relevance in different relevance conditions are preset for the first service and the second service. After the user requests the first service, it is first determined which relevance condition of the foregoing relevance conditions, such as weather, time, a location, and a distance (customized according to different service types), is met in the environmental condition during the requesting. Then, a relevance degree corresponding to the met relevance condition is determined as the degree of relevance between the first service and the second service. Compared with a manner in which the degree of relevance between the first service and the second service is set to a fixed value, the obtained relevance degree is more accurate.

A degree of relevance between services is the basis of recommending a service. The relevance degree may be indicated by using a relevance condition and a relevance degree. The relevance condition indicates that two services may have different degrees of relevance when different conditions are met, which is, for example, but not limited to the following: the service "restaurant reservation" has relatively high relevance to the service "taxi booking" when the user is relatively far away from the restaurant; otherwise, the relevance is relatively low. The relevance degree may be one or more indicators, and each indicator may be indicated by using binary relevance (for example, but not limited to "related" and "unrelated"), or may be indicated by using probability relevance.

In step 320, the potential service may be one service, or may include multiple services. When the potential service includes multiple services, these services may be ranked, to recommend a service most related to the first service to the user. A manner of ranking services that may be recommended includes but is not limited to the following: the services may be ranked according to relevance degrees; the services may be ranked according to a set default sequence or a preference sequence set by the user, which is, for example, but not limited to the following: when calculation results of relevance degrees of multiple services are the same, the services may be first ranked according to preference set by the user, and then ranked according to the default sequence set by a system; or a combination of the foregoing manners.

Optionally, as an embodiment, a service parameter of each of the multiple services that the intelligent assistant can provide is further recorded in the service relationship model, where the service parameter is a parameter to which a value needs to be assigned when a third-party application provides a corresponding service. The method in FIG. 1 may further include extracting, from the service relationship model, service parameters of all services including the first service and the potential service; and allocating, in a session cache, a corresponding session in a session cache to each of all the services, where a service parameter of a corresponding service is contained in content of the session, and sessions in the session cache share a value of a respectively stored service parameter with each other.

In this embodiment of the present disclosure, a corresponding session in the session cache is allocated to each service, and the value of the service parameter in the content of the session is shared. In this way, when a value is assigned to a service parameter in the session, other sessions that have a same service parameter can directly use the value, and assign the value to the same service parameter, thereby avoiding repeatedly requesting the user to assign a value to the same service parameter, and facilitating an operation of the user.

One session represents one service or a group of services that are involved in meeting one request of the user (including an active request and a potential requirement that are of the user). Therefore, one layer of session or multiple layers of sessions may exist in the session cache. A bottommost-layer session is corresponding to a service, and multiple associated sessions may be combined into an upper-layer session; and the rest can be deduced by analogy. When processing of one bottommost-layer session is complete, it indicates that processing of one service provided by the intelligent assistant is complete. When processing of one uppermost-layer session is complete, it indicates that the intelligent assistant already completes a series of requests from the user (including the active request and the potential requirement that are of the user), and provides a series of services. One session may include one or more child sessions (lower-layer sessions), and the session becomes a parent session (an upper-layer session) of the child sessions.

Content of a session indicates data required for providing a service, and includes but is not limited to a service name, a value of a service parameter, and a session status. The service name in the session may be obtained by parsing the request information of the user, which is, for example, but not limited to the following: the user enters "Reserve a table for two persons at 6 pm at Haidilao (a renowned restaurant in China)", a service name is "restaurant reservation" by means of parsing, and the service name is buffered to the session. Alternatively, the service name may be acquired according to a generated recommended service, which is, for example, but not limited to the following: the service relationship model is queried according to the service name "restaurant reservation" that is currently provided, other recommendable service names, such as "restaurant coupon" and "reminder creating", are acquired, and these names are buffered to the session. A type of the service parameter may be acquired by querying the service relationship model according to the service name. The value of the service parameter may be acquired by parsing the request information of the user, which is, for example, but not limited to the following, the user enters "Reserve a table for two persons at 6 pm at Haidilao", the type and the value that are of the service parameter "time, 6 pm" and "quantity of persons: two", and potential scenario information, such as GPS information indicating a city that the user is in, are acquired by means of parsing. The information is buffered to the service parameter of the service name "restaurant reservation" in the session.

A session may be classified into an active session and an inactive session. The active session refers to a session that is being processed, and indicates that a service corresponding to the active session is currently being provided to the user. The inactive session is a session of a potential service that is created in advance according to the session that is being processed. The active session and the inactive session may simultaneously exist, or only the active session exists.

An intelligent assistant apparatus performs unified management on a life cycle of a session. A session is created when a previous session is complete and the user starts to enter a new request. If a current service has another potential service, a corresponding child session (a lower-layer session) is created. After processing of a service (including a service corresponding to the active request of the user and a subsequently generated potential service) is complete, a corresponding child session is closed. If processing of all child sessions is complete, the parent session (at the upper layer) is closed; and the rest can be deduced by analogy. In addition, session closing may also be that the user actively closes the parent session even if processing of all the child sessions is not complete. When the parent session is closed, all the child sessions are closed even if the child sessions are not complete. A manner in which the user actively closes the parent session includes but is not limited to the following: the user enters particular session closing information; the user disables the intelligent assistant; the user does not respond within a particular time interval; and the like. The intelligent assistant may dynamically create a new session (a parent session or a child session) according to a requirement (for example, but not limited to the following: a potential service is determined, or the user initiates a new service request).

In addition, the intelligent assistant may create a session when the user enters a new request or selects a potential service recommended to the user. When a session is created, content of the session is initialized by using information (including but is not limited to a service name, a service type, a service parameter, and the like) about a corresponding service in the service relationship model. In addition, the newly created session is buffered to the session cache, and is associated with an existing session. A manner in which the intelligent assistant associates the newly created session includes but is not limited to the following, when a service corresponding to the newly created session is related to a service corresponding to the active session, the newly created session is associated, as a child session, with the active session; according to a service type of the newly created service, the newly created session is associated, as a child session, with a parent session of a session of a same type; or a combination of the foregoing manners.

The intelligent assistant traverses all sessions in the session cache, processes all traversed sessions (that is, the active session) according to a policy, and provides a corresponding service, until processing of all the sessions is complete. A manner in which the intelligent assistant processes a session includes but is not limited to the following:

For the active session, if there is one or more mandatory service parameters to which values are not assigned, a guiding question is generated to remind the user of entering corresponding information. For example, content of the active session may include the service name "restaurant reservation", and service parameters "restaurant name, Haidilao", "time, NULL", and "quantity of persons: NULL", the intelligent assistant apparatus generates a guiding question "Please enter reservation time and a quantity of persons at Haidilao restaurant" by using the foregoing information.

For the active session, if values are assigned to all required mandatory service parameters, the intelligent assistant acquires a service result.

For the active session, the intelligent assistant apparatus may also generate a guiding question to remind the user of entering information corresponding to an optional service parameter, to help filter the acquired service result.

For the active session, if the user is not satisfied with a current service result, the intelligent assistant may redirect the user to enter a service parameter, to acquire a service result again.

When processing of the active session is complete, the intelligent assistant shares the service parameters of the active session with an inactive session as required.

When processing of the active service is complete, the intelligent assistant selects a next inactive session from the cache as the active session and processes the session.

When entering a new active session, the intelligent assistant may generate a guiding question and queries the user whether a corresponding service is required. For example, if the active session is corresponding to a newly recommended service "using a coupon" and a service parameter "Merchant: Haidilao", the intelligent assistant may generate a guiding question "Is it necessary to search for a Haidilao restaurant coupon for you?" based on the foregoing information.

Before the intelligent assistant enters the new active session, a current active session is a parent session of a group of sessions, and a service management module may generate a guiding question to query the user whether a series of these corresponding services are required. For example, the active session is corresponding to a group of newly recommended potential services "using a coupon", "setting a schedule", and "ordering", the intelligent assistant may generate a guiding question "A dining schedule is already set for you. Is it necessary to search for a coupon or order in advance?" based on the foregoing information.

When the user actively enters a request indicating that a service or some services are not required, the intelligent assistant closes one or more sessions corresponding to the service or some services, or closes all sessions.

In addition, when the intelligent assistant parses the user input, the service relationship model and information in the session cache may be used to assist the intelligent assistant in parsing, which includes but is not limited to the following:

A current user input is parsed according to the content of the active session, such as a context of the user input. For example, the content of the active session includes but is not limited to the service name "restaurant reservation" and the service parameter "restaurant name: Haidilao". If the user enters "A compartment is wanted", the intelligent assistant may learn, by means of parsing, that an intention of the user is "Reserve a compartment at Haidilao restaurant", and output a service parameter "compartment: yes".

The current user input is parsed according to the content of the active session, such as a session scope. For example, the content of the active session includes the service name "restaurant reservation", the service parameter "restaurant name: Haidilao", and a session status "Request the user to enter reservation time". If the user enters "6 pm", the intelligent assistant may learn, by means of parsing, that the intention of the user is "Reservation time at Haidilao restaurant is at 6 pm", and output a service parameter "time: 6 pm". For another example, the session status of the active session is "Recommend a service". If the user enters "Not required", the intelligent assistant closes the current active session.

In addition, when parsing the user input, the intelligent assistant may further obtain one or more results by means of screening, filtering, merging, and ranking, and by comprehensively using various intention understanding manners. The results may be used for the intelligent assistant to create a session and fill content of the session.

The intelligent assistant may generate a guiding question and a result reply by using a natural language generation technology, or may provide a set of templates for each service, and then perform filling according to the content of the session.

That the intelligent assistant may generate the guiding question and the result reply by using the session cache may include the following: the result reply may be filled according to the content of the active session. For example, the content of the active session includes the service name "restaurant reservation", the service parameters "restaurant name: Haidilao", "time: 6 pm", and "quantity of persons: 2", and the intelligent assistant may generate a result reply "A table for two persons at 6 pm at the Haidilao restaurant has been reserved for you".

A guiding question required for completing the active session may be filled according to the content of the active session. For example, the content of the active session includes but is not limited to the service name "restaurant reservation", and the service parameters "restaurant name: Haidilao", "time: NULL", and "quantity of persons: NULL", the intelligent assistant apparatus may generate a guiding question "Please enter reservation time and a quantity of persons at the Haidilao restaurant".

A guiding question required for completing a recommended service may be filled according to the content of the active session. For example, after an active session of the service name "restaurant reservation" is complete, content of a next inactive session includes the service name "using a coupon" and the service parameter "restaurant name: Haidilao", and the intelligent assistant may generate a guiding question "Would you like a Haidilao restaurant coupon recommended for you?".

Optionally, as an embodiment, the foregoing potential service includes a third service, a trigger condition of the third service is further recorded in the service relationship model, and step 320 may include, after an instruction for requesting the third-party application to provide the third service is generated, detecting whether the trigger condition is met; and when the trigger condition is not met, temporarily storing the instruction in a cache; or when the trigger condition is met, sending the instruction to the third service.

In this embodiment of the present disclosure, the trigger condition of the third service is preset. Before the instruction for requesting the third-party application to provide the third service is sent to the third-party application, whether the trigger condition of the third service is met is first detected. The instruction is sent to the third-party application only when the trigger condition is met; otherwise, the instruction is buffered until the trigger condition is met. Compared with a manner in which the second service is directly recommended to the user without setting the trigger condition, a service can be provided to the user at proper time, at a proper place, or under a proper condition, thereby improving user experience.

Different trigger conditions may be provided for services of different types or different names. The trigger condition is an event that a device can monitor, which includes but is not limited to a time arrival event, a geographical location arrival event, a particular-sensor triggering event, an event that a particular sensor detects that data reaches a preset value, an event that a particular message pushed by a particular third-party application arrives, an event that the device learns that particular information of a particular third-party application meets a preset value, and the like. For example, the service "taxi booking" may include a trigger condition "time", that is, when the time reaches a preset value, the service "taxi booking" is triggered to be executed. The service "using a coupon" may include a trigger condition "merchant discounting activity", that is, when a message pushed for a particular merchant discounting activity is received, the service "using a coupon" is triggered to be executed.

In addition, the trigger condition may indicate whether the intelligent assistant immediately acquires a service result or acquires the service result until a condition is met when a session corresponding to the service is complete. One or more trigger conditions of the service may be recorded in the service relationship model.

In addition, if there is a trigger condition, but a value is not assigned, the intelligent assistant may direct, by using an intention processing module, the user to enter a condition, or may fill a condition according to a user setting or a system default setting.

It should be noted that, when allocating a session corresponding to a service, the intelligent assistant may store a trigger condition of the service in the session. When processing of the active session is complete, the intelligent assistant determines, according to a value of the trigger condition of the service, whether to immediately acquire a service result. If the intelligent assistant determines, according to the value of the trigger condition of the service, to immediately acquire the service result, the service result is acquired; otherwise, a monitoring condition is set according to the trigger condition, to monitor time when an event corresponding to the trigger condition occurs.

An event that can be monitored includes but is not limited to the following:

A time event: it monitors whether time and a date of a device reach a preset value.

A location event: it monitors whether location information (including but is not limited to GPS information and an administrative area) of a device reaches a preset value.

A sensor event: it monitors whether information acquired by using a sensor (including but is not limited to acceleration, a magnetic force, a direction, a gyroscope, light sensing, pressure, a temperature, face sensing, gravity, a rotating vector, or the like) reaches a preset value.

An information pushing event: it monitors whether particular information pushed by a particular third-party application and received by a device reaches a preset value.

An information querying event: it monitors whether particular information of a particular third-party application that is periodically checked by a device reaches a preset value.

A manner in which the intelligent assistant compares the monitored information with the preset value of the trigger condition may include a precise comparison, that is, the monitored information and the preset value are the same; and a range comparison, that is, the monitored information fluctuates within a range of the preset value.

In addition, when the intelligent assistant completes a session, and if it is discovered that there is a trigger condition to which a value is assigned, an instruction for acquiring a service may be buffered. When a monitored event occurs, the intelligent assistant extracts the instruction from an instruction cache, and acquires the service result. A buffered instruction may be in a one-to-one correspondence with a trigger condition, so that the intelligent assistant may retrieve a corresponding instruction by using the trigger condition.

Figure 4:
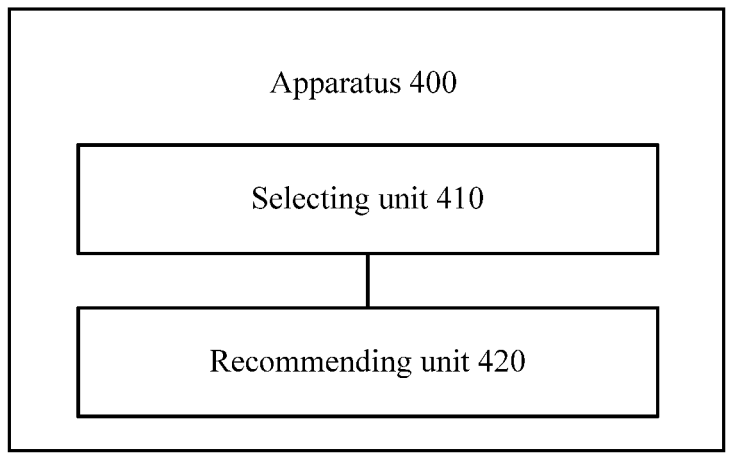
FIG. 4 is a schematic block diagram of an apparatus with an intelligent assistant according to an embodiment of the present disclosure.

With reference to FIG. 1 to FIG. 3, the foregoing describes in detail the service recommendation method according to embodiments of the present disclosure; with reference to FIG. 4, the following describes in detail an apparatus with an intelligent assistant according to an embodiment of the present disclosure.

FIG. 4 is a schematic block diagram of an apparatus with an intelligent assistant according to an embodiment of the present disclosure. It should be understood that, an apparatus 400 in FIG. 4 can implement all steps in FIG. 3. To avoid repetition, details are not described herein again. The apparatus 400 includes a selecting module 410 and a recommending module 420.

The selecting module 410 is configured to, when a user of a terminal requests a first service from an intelligent assistant, select, according to a name of the first service and by using a pre-established service relationship model, a potential service with a degree of relevance to the first service that meets a preset condition from multiple services that the intelligent assistant can provide, where names of the multiple services and degrees of relevance of the multiple services to each other are recorded in the service relationship model.

The recommending module 420 is configured to recommend the potential service selected by the selecting module 410 to the user.

In this embodiment of the present disclosure, after a user requests a first service, a potential service with a degree of relevance to the first service that meets a preset condition is selected, by using a pre-established service relationship model, from services supported by an intelligent assistant, and these potential services are recommended to the user, so that after requesting a service, the user does not need to actively and repeatedly request a subsequent service related to the service from the intelligent assistant, thereby facilitating use for the user.

Optionally, as an embodiment, the preset condition is a threshold for a relevance degree, and the selecting module 410 may be specifically configured to determine degrees of relevance of all the multiple services to the first service according to the name of the first service and by using the service relationship model; and determine, among the multiple services, a service with a degree of relevance to the first service that meets the threshold as the potential service.

Optionally, as an embodiment, the preset condition is a threshold for a quantity of services recommended to the user, and the selecting module 410 may be further configured to determine degrees of relevance of all the multiple services to the first service according to the name of the first service and by using the service relationship model; and rank the degrees of relevance of the multiple services to the first service, to determine, among the multiple services, a service whose ranking falls within the threshold as the potential service.

Optionally, as an embodiment, the recommending module 420 may be further configured to recommend, according to ranking of degrees of relevance of all the potential services to the first service, a service with a relatively high degree of relevance to the first service among the potential services to the user.

Optionally, as an embodiment, the services that the intelligent assistant can provide include a second service, degrees of relevance between the first service and the second service in different relevance conditions are recorded in the service relationship model, and the selecting module 410 may be further configured to, according to the name of the first service and an environmental condition for the user when requesting the first service, and by using the service relationship model, determine a relevance degree corresponding to a relevance condition among the different relevance conditions that is met in the environmental condition as a degree of relevance between the first service and the second service; and when the degree of relevance between the first service and the second service meets the preset condition, determine the second service as one of the potential services.

Optionally, as an embodiment, a service parameter of each of the multiple services that the intelligent assistant can provide is further recorded in the service relationship model, where the service parameter is a parameter to which a value needs to be assigned when a third-party application provides a corresponding service; and the apparatus 400 further includes an extracting module configured to extract, from the service relationship model, service parameters of all services including the first service and the potential service; and an allocating module configured to allocate, in a session cache, a corresponding session in a session cache to each of all the services, where a service parameter of a corresponding service is contained in content of the session, and sessions in the session cache share a value of a respectively stored service parameter with each other.

Optionally, as an embodiment, the potential service includes a third service, a trigger condition of the third service is further recorded in the service relationship model, and the recommending module 420 may be further configured to, after an instruction for requesting the third-party application to provide the third service is generated, detect whether the trigger condition is met; and when the trigger condition is not met, buffer the instruction in a cache; or when the trigger condition is met, send the instruction to the third service.

Optionally, as an embodiment, a degree of relevance between any two services among the multiple services that the intelligent assistant can provide is used to indicate, after the user requests one of the two services, a probability of requesting the other service.

Optionally, as an embodiment, the apparatus 400 may be a server on a network side, and the terminal may be a terminal served by the server.

Optionally, as an embodiment, the apparatus 400 is the terminal.

Figure 5:
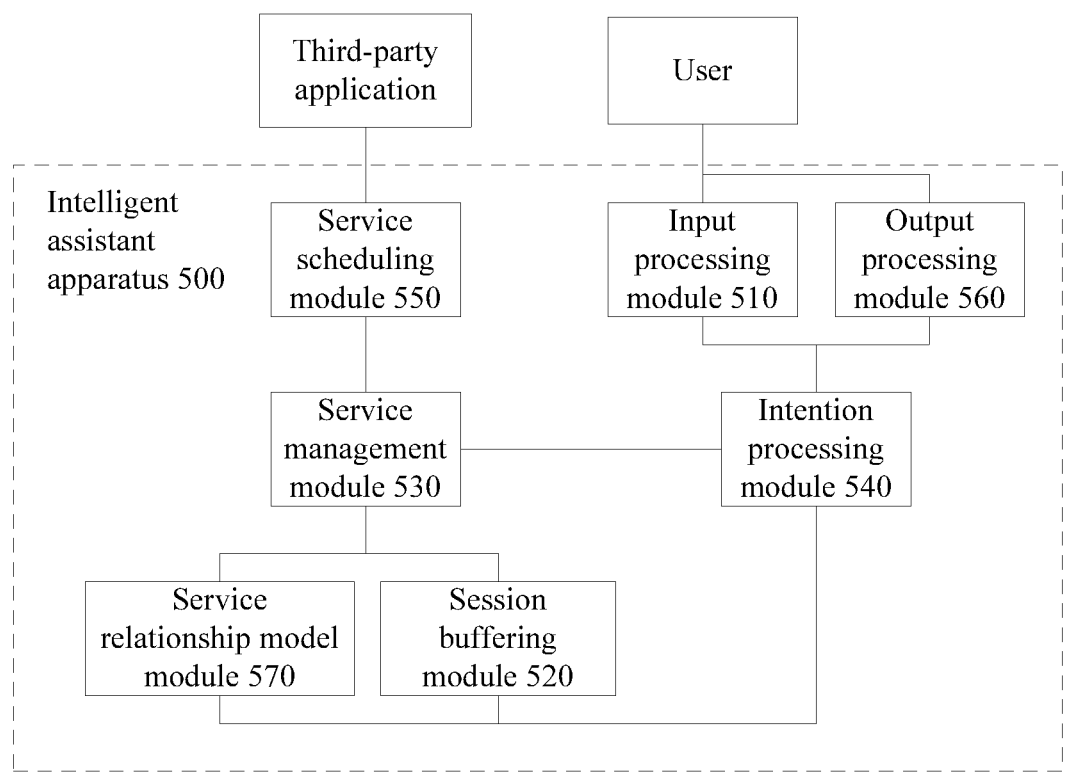
FIG. 5 is a schematic block diagram of an apparatus with an intelligent assistant according to an embodiment of the present disclosure.

It should be noted that, the foregoing apparatus with an intelligent assistant has multiple module division manners, and a division manner in FIG. 4 is merely an example. Regardless of a module division manner, each module may be implemented by using hardware (such as a circuit), software, or in a manner of combining hardware and software. With reference to FIG. 5, the following shows an example of another module division manner of the apparatus with an intelligent assistant. In FIG. 5, the apparatus with an intelligent assistant is divided into an input processing module 510, a session buffering module 520, a service management module 530, an intention processing module 540, a service scheduling module 550, an output processing module 560, and a service relationship model module 570. A function of the selecting module 410 in FIG. 4 may be implemented by using the service management module 530 in FIG. 5, and a function of the recommending module 420 in FIG. 4 may be jointly implemented by the intention processing module 540 and the output processing module 560 in FIG. 5.

FIG. 5 is a schematic block diagram of an apparatus with an intelligent assistant according to an embodiment of the present disclosure. An apparatus 500 with an intelligent assistant in FIG. 5 can implement all steps in FIG. 3. To avoid repetition, details are not described herein again.

The input processing module 510 is configured to collect, convert, and correct information entered by a user.

The session temporarily storing module 520 is configured to buffer session content corresponding to a service requested by the user or a potential service recommended to the user, and provide required context data, such as a service name and a service parameter, to the service management module 530 and the intention processing module 540.

The service management module 530 is configured to select and rank potential services, and manage a session buffered in the session temporarily storing module 520.

The intention processing module 540 is configured to parse the information entered by the user, and extract, from the information, the required data such as the service name and the service parameter; generate a guiding question according to a request of the service management module 530, and instruct the user to enter the required data; and generate reply information including a service result.

The service scheduling module 550 is configured to select a corresponding third-party application according to a service type (such as a service name) instructed by the service management module 530, invoke an API of the third-party application, and pass a service parameter; and acquire, filter, merge, and rank service results returned by the third-party application.

The output processing module 560 is configured to output a guiding question, a result reply, and the like according to an instruction of the intention processing module 540.

The service relationship model module 570 is configured to store a service relationship model.

Both the foregoing input processing module 510 and the output processing module 560 can communicate with the user, and the foregoing service scheduling module 550 can communicate with the third-party application.

Figure 6:
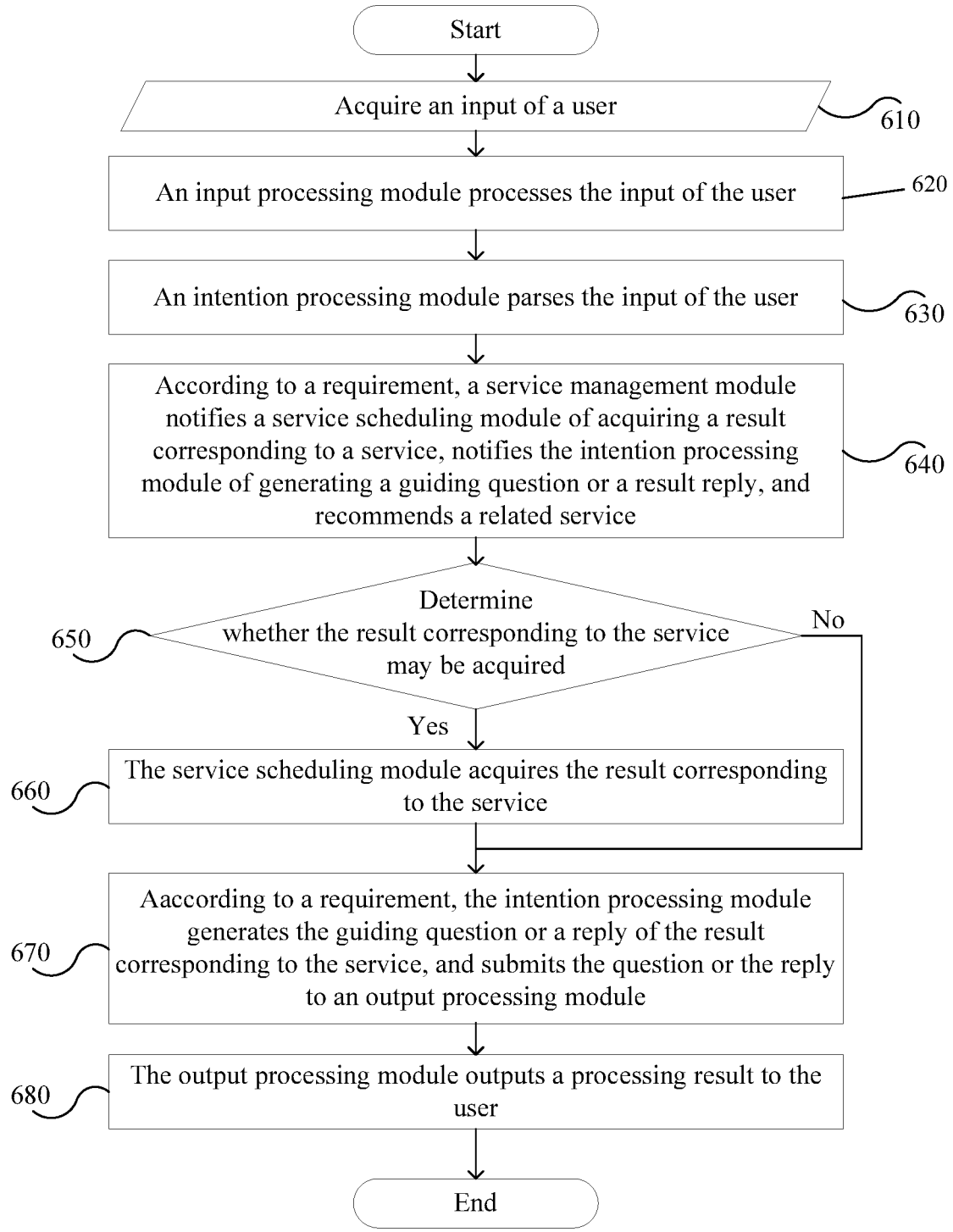
FIG. 6 is a schematic flowchart of a service recommendation method according to an embodiment of the present disclosure.
Figure 7:
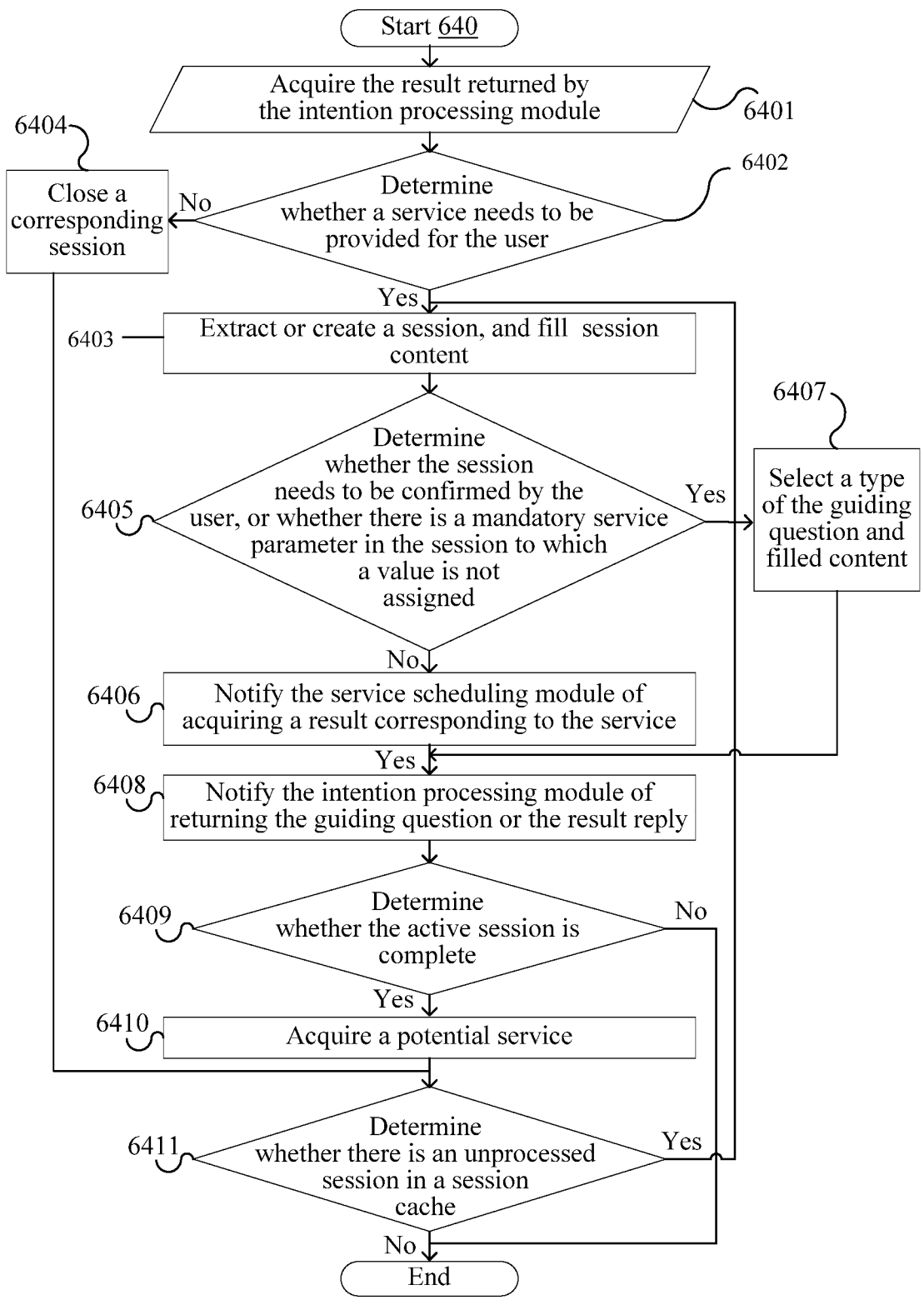
FIG. 7 is a schematic diagram of a detailed procedure of a step in FIG. 6 executed by a service management module.
Figure 8:
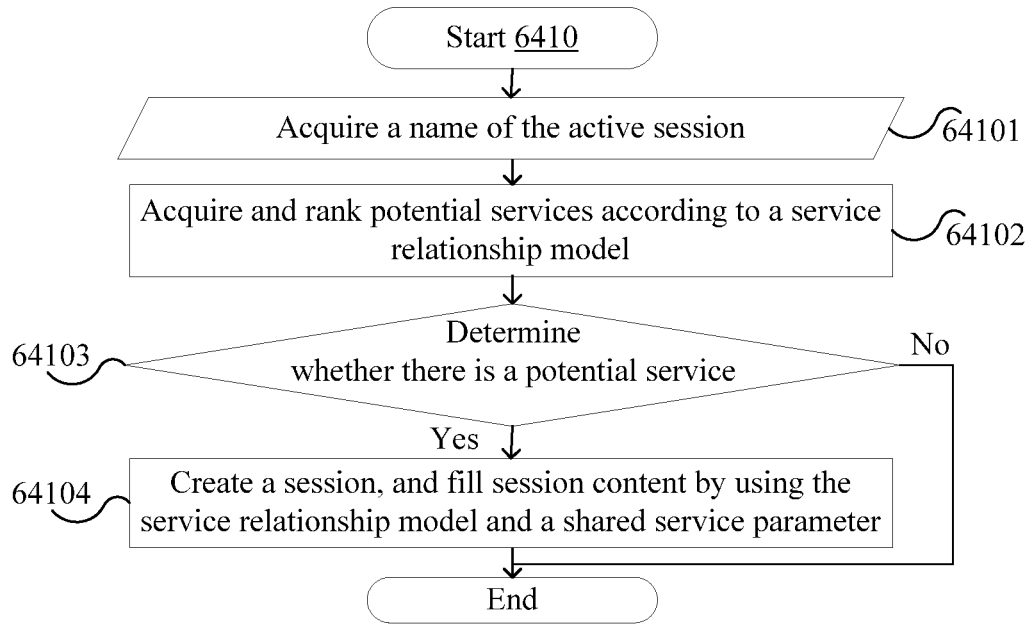
FIG. 8 is a schematic diagram of a detailed procedure of a step of acquiring a recommended service in FIG. 7.

With reference to FIG. 6 to FIG. 8, the following shows a schematic flowchart of a service recommendation method according to an embodiment of the present disclosure in a case in which module division is shown in FIG. 5.

610. Acquire an input of a user.

Data such as text, speech, an image, or an operation instruction that is entered by the user may be acquired.

620. An input processing module processes the input of the user.

For example, the input processing module collects the data entered by the user, converts or standardizes different formats of the input data to a format that can be identified by a system, and corrects an error that may exist in the input data.

630. An intention processing module parses a processing result of the input processing module.

For example, the intention processing module may extract corresponding information from the processing result of the input processing module according to information recorded in a service relationship model, such as a service name and a service parameter; and pass a parsing result to a service management module; or directly submit the parsing result to a session temporarily storing module for storing, and instructs the service management module to fetch the parsing result in a session cache.

640. A service management module processes a parsing result of the intention processing module.

For example, according to the parsing result, the service management module notifies the intention processing module of generating a guiding question, notifies a service scheduling module of acquiring results corresponding to a service, notifies the intention processing module of generating a result reply, or provides recommendation of a potential service.

650. The service management module determines, according to a status of an active session, whether to acquire results corresponding to a service; if the service management module determines, according to the status of the active session, to acquire the results corresponding to the service, execute step 660; otherwise, execute step 670.

660. A service scheduling module acquires the results corresponding to the service.

For example, the service scheduling module selects one or more corresponding third-party applications according to data (including but is not limited to a service name and a service parameter) submitted by the service management module, and invokes an API of the one or more corresponding third-party applications; collects the results corresponding to the service that are returned by the one or more third-party applications; filters, merges, and ranks the service results, and return the results to the service management module.

670. According to a requirement, the intention processing module generates a guiding question or replies of the results corresponding to the service, and submits the question or the replies to an output processing module.

680. The output processing module generates final output content.

The output content may be text, speech, an image, a web page, or the like, and is presented to the user.

FIG. 7 is a schematic diagram of a detailed procedure of the step executed by the service management module in FIG. 6 (that is, step 640).

6401. Acquire the parsing result returned by the intention processing module.

For example, the intention processing module may directly submit the parsing result to the service management module, or the intention processing module buffers the parsing result in the session cache, and notifies the service management module of acquiring the parsing result at a specified location.

6402. Determine whether a service needs to be provided for the user.

The service management module determines, according to the foregoing parsing result, whether the user hopes to be provided with a service or refuses a service; and if the user hopes to be provided with a service, step 6403 is executed; otherwise, step 6404 is executed.

6403. Extract or create a session, and fill session content.

If the user hopes to be provided with a service, and the service management module determines, according to the parsing result, that the user requests a new service, a session of a corresponding service is created according to the service relationship model; or if a user request is a supplement to a previous request, a corresponding session is extracted from the session cache; or if processing of a previous session is complete, a next unprocessed session or a next group of unprocessed sessions are extracted from the session cache for processing. In addition, the parsing result is used to fill the session content. If an active session is not corresponding to a service currently requested by the user, the active session further needs to be reset.

6404. Close a corresponding session.

If the user refuses a service, the service management module closes a service or a group of service, and closes a session corresponding to the service or sessions corresponding to these services.

6405. Determine whether the session needs to be confirmed by the user, or whether there is a mandatory service parameter in the session to which a value is not assigned; if the session needs to be confirmed by the user or there is a mandatory service parameter in the session to which a value is not assigned, execute step 6407; and if the session does not need to be confirmed by the user or there is not a mandatory service parameter in the session to which a value is not assigned, execute step 6406.

6406. Instruct the service scheduling module to acquire the results corresponding to the service.

If the active session does not need to be confirmed by the user and there is not a mandatory service parameter to which a value is not assigned, it indicates that information required for providing a corresponding service has been acquired, and the service management module submits a service name and a service parameter to the service scheduling module, and notifies the service scheduling module of acquiring the service results.

6407. Select a type of the guiding question and filled content.

If the active session needs to be confirmed by the user or there is a mandatory service parameter to which a value is not assigned, the service management module selects a corresponding type of the guiding question, and collects content that should be filled in the guiding question.

6408. Instruct the intention processing module to return the guiding question or the result reply.

6409. Determine whether the active session has been complete.

If the active session is not complete, it indicates that the active session needs to wait for a further request of the user, and therefore, a procedure in FIG. 7 is directly exited; if the active session is complete, step 6410 is executed.

6410. Acquire a recommended service.

If the active session is complete, according to the service relationship model, the service management module selects and ranks one or more recommendable services, and creates a corresponding session and adds the corresponding session to the session cache according to the ranking.

6411. Determine whether there is an unprocessed session in a session cache; and if there is an unprocessed session in the session cache, return to step 6403; otherwise, end a procedure in FIG. 7.

FIG. 8 is a schematic diagram of a detailed procedure of the acquiring a potential service in FIG. 7 (that is, step 6410).

64101. Acquire a service name of the active session.

64102. Acquire and rank potential services according to a service relationship model.

64103. Determine whether there is a potential service; if there is a potential service, execute step 64104; if there is no potential service, exit a procedure in FIG. 8.

64104. Create a session, and fill session content by using the service relationship model and a shared service parameter.

Figure 9:
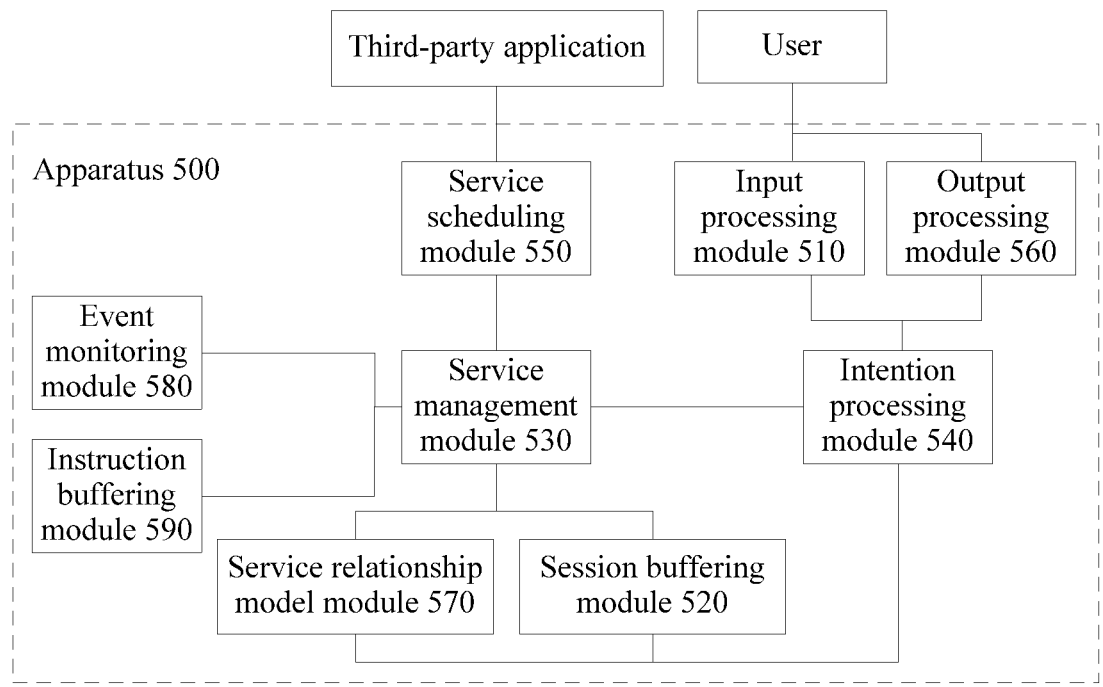
FIG. 9 is a schematic block diagram of an apparatus with an intelligent assistant according to an embodiment of the present disclosure.

In addition, as shown in FIG. 9, the apparatus 500 in FIG. 5 may further include, an event monitoring module 580 configured to monitor a service trigger condition, and when the service trigger condition is met, notify the service management module 530; and an instruction buffering module 590 configured to buffer an instruction submitted by the service management module 530 to the service scheduling module 550, and when the service trigger condition is met, instruct the instruction buffering module 590 to submit the instruction buffered in the instruction buffering module 590 to the service scheduling module 550.

Figure 10:
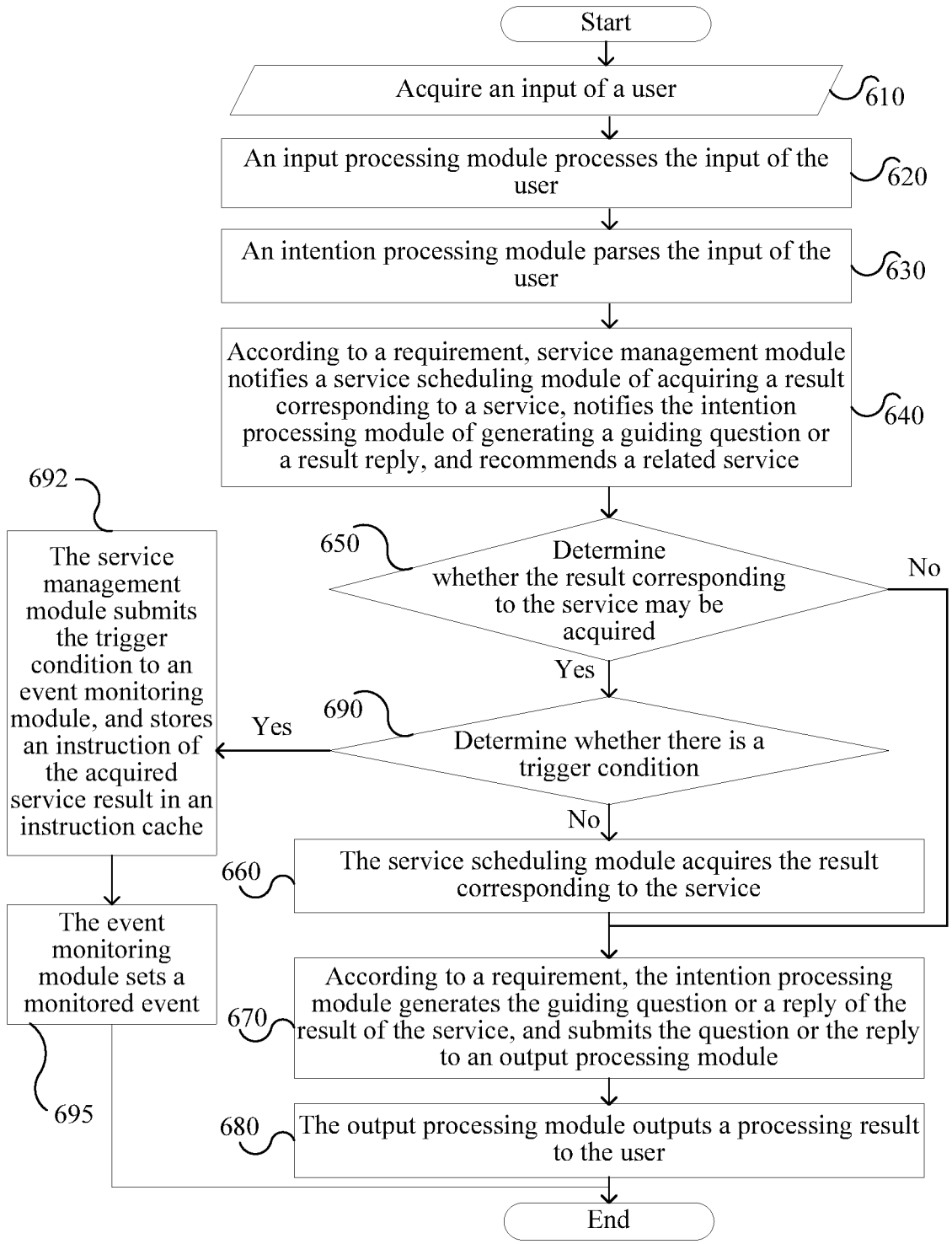
FIG. 10 is a schematic flowchart of a service recommendation method according to an embodiment of the present disclosure.

According to the apparatus 500 with an intelligent assistant shown in FIG. 9, on a basis of FIG. 6, step 690, step 692, and step 695 are added in FIG. 10.

690. Determine whether an active session has a trigger condition; if the active session has a trigger condition, execute step 692; if the active session does not have a trigger condition, execute step 695.

In other words, it is determined whether a service result needs to be acquired for a service corresponding to the active session until a particular condition is met.

692. A service management module submits the trigger condition to an event monitoring module, and buffers an instruction of the acquired results corresponding to a service in an instruction cache.

When a corresponding event is triggered or a corresponding condition is met, the service management module may fetch and directly execute the instruction.

695. The event monitoring module sets a monitored event.

For example, the event monitoring module sets, according to the service trigger condition submitted by the service management module, one or more triggers (including but not limiting to a time trigger, a location trigger, various sensors, a third-party service information monitor, or the like) that need to be monitored, and a preset monitoring value, a range, or the like.

It should be noted that, after the foregoing service trigger condition is triggered, the service management module acquires a corresponding instruction from the instruction cache; notifies a service scheduling module of acquiring a service result; and after the service result is received, notifies an intention processing module of returning the result corresponding to the service to a user.

Figure 11:
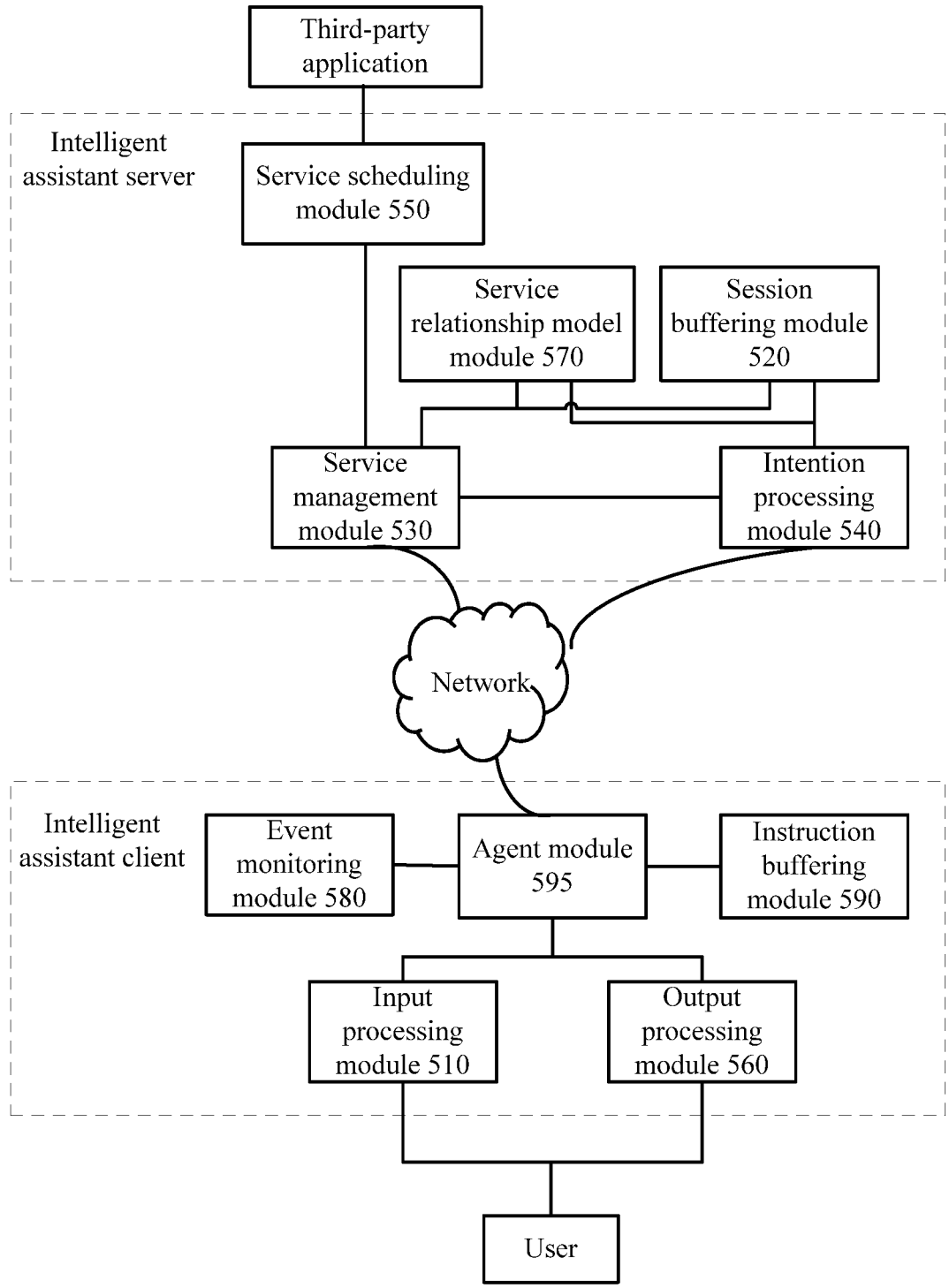
FIG. 11 is a schematic block diagram of an apparatus with an intelligent assistant in a distributed system according to an embodiment of the present disclosure.

FIG. 11 shows a connection relationship of all modules in FIG. 6 in a distributed system shown in FIG. 2. In FIG. 7, an agent module 595 is configured in an intelligent assistant client, and can communicate with a service management module 530 in an intelligent assistant server by using a network. An input processing module 510, an output processing module 560, an event monitoring module 580, and an instruction temporarily storing module 590 are integrated on a client side, and the other modules are located in the server.

Figure 12:
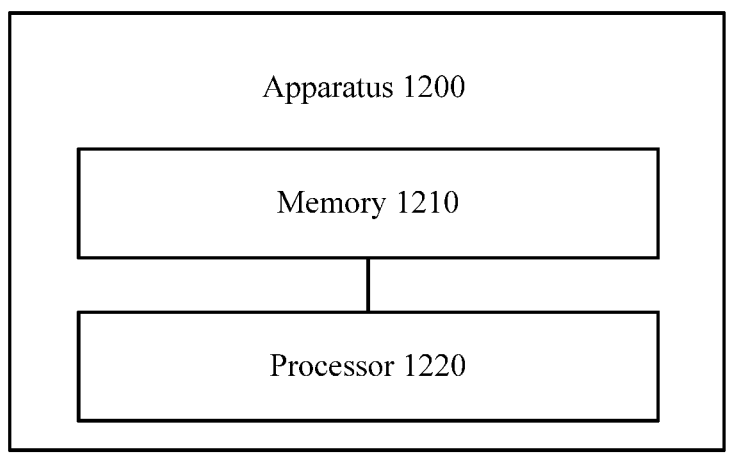
FIG. 12 is a schematic block diagram of an apparatus with an intelligent assistant according to an embodiment of the present disclosure.

FIG. 12 is a schematic block diagram of an apparatus with an intelligent assistant according to an embodiment of the present disclosure. An apparatus 1200 in FIG. 12 includes a memory 1210 and a processor 1220. It should be understood that, the apparatus 1200 can implement all steps in FIG. 3. To avoid repetition, details are not described herein again.

The memory 1210 is configured to store a program.

The processor 1220 is configured to, when a user of a terminal requests a first service from an intelligent assistant, select, according to a name of the first service and by using a pre-established service relationship model, a potential service with a degree of relevance to the first service that meets a preset condition from multiple services that the intelligent assistant can provide, where names of the multiple services and degrees of relevance of the multiple services to each other are recorded in the service relationship model; and recommend the potential service to the user.

In this embodiment of the present disclosure, after a user requests a first service, a potential service with a degree of relevance to the first service that meets a preset condition is selected, by using a pre-established service relationship model, from services supported by an intelligent assistant, and these potential services are recommended to the user, so that after requesting a service, the user does not need to actively and repeatedly request a subsequent service related to the service from the intelligent assistant, thereby facilitating use for the user.

Optionally, as an embodiment, the preset condition is a threshold for a relevance degree, and the processor 1220 may be specifically configured to, determine degrees of relevance of all the multiple services to the first service according to the name of the first service and by using the service relationship model; and determine, among the multiple services, a service with a degree of relevance to the first service that meets the threshold as the potential service.

Optionally, as an embodiment, the preset condition is a threshold for a quantity of services recommended to the user, and the processor 1220 may be specifically configured to, determine degrees of relevance of all the multiple services to the first service according to the name of the first service and by using the service relationship model; and rank the degrees of relevance of the multiple services to the first service, to determine, among the multiple services, a service whose ranking falls within the threshold as the potential service.

Optionally, as an embodiment, the processor 1220 may be specifically configured to recommend, according to ranking of degrees of relevance of all the potential services to the first service, a service with a relatively high degree of relevance to the first service among the potential services to the user.

Optionally, as an embodiment, the services that the intelligent assistant can provide include a second service, degrees of relevance between the first service and the second service in different relevance conditions are recorded in the service relationship model, and the processor 1220 may be specifically configured to, according to the name of the first service and an environmental condition for the user when requesting the first service, and by using the service relationship model, determine a relevance degree corresponding to a relevance condition among the different relevance conditions that is met in the environmental condition as a degree of relevance between the first service and the second service; and when the degree of relevance between the first service and the second service meets the preset condition, determine the second service as one of the potential services.

Optionally, as an embodiment, a service parameter of each of the multiple services that the intelligent assistant can provide is further recorded in the service relationship model, where the service parameter is a parameter to which a value needs to be assigned when a third-party application provides a corresponding service; and the processor 1220 may be further configured to extract, from the service relationship model, service parameters of all services including the first service and the potential service; and allocate, in a session cache, a corresponding session in a session cache to each of all the services, where a service parameter of a corresponding service is contained in content of the session, and sessions in the session cache share a value of a respectively stored service parameter with each other.

Optionally, as an embodiment, the potential service includes a third service, a trigger condition of the third service is further recorded in the service relationship model, and the processor 1220 may be specifically configured to, after an instruction for requesting the third-party application to provide the third service is generated, detect whether the trigger condition is met; and when the trigger condition is not met, buffer the instruction in a cache; or when the trigger condition is met, send the instruction to the third service.

Optionally, as an embodiment, a degree of relevance between any two services among the multiple services that the intelligent assistant can provide may be used to indicate, after the user requests one of the two services, a probability of requesting the other service.

Optionally, as an embodiment, the apparatus 1200 may be a server on a network side, and the terminal may be a terminal served by the server.

Optionally, as an embodiment, the apparatus 1200 may be the terminal.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes, any medium that can store program code, such as a USB flash drive, a removable hard disk, a read-only memory (ROM), a random-access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service recommendation method, comprising:
receiving, by an intelligent assistant, a request for a first service;
parsing, by the intelligent assistant, the request for the first service using natural language processing;
extracting, by the intelligent assistant, a service name from the request after parsing the request, wherein the service name indicates a type of the first service;
determining a type of service parameter for the first service based on the service name, wherein the type of service parameter for the first service is recorded in a pre-established service relationship model indicating a relationship between two or more services, wherein the pre-established service relationship model comprises a plurality of service names of a plurality of services provided by the intelligent assistant, corresponding degrees of relevance of the plurality of services to the first service, a plurality of corresponding trigger conditions of the plurality of services, and types of service parameters of the plurality of services, wherein each service parameter is a configuration parameter of a third-party application that provides a corresponding service, wherein each service parameter comprises a mandatory parameter and an optional parameter, wherein the mandatory parameter is a parameter that must be received to invoke the first potential service, and wherein the optional parameter is a parameter that is optionally received with the mandatory parameter;

extracting, by the intelligent assistant, a service parameter for the first service from the request based on the type of service parameter indicated in the pre-established service relationship model after parsing the request;

selecting, by the intelligent assistant, a first potential service with a first degree of relevance to the first service based on the service name, the service parameter, and the pre-established service relationship model indicating that a degree of relevance between the first potential service and the first service meets a threshold;

generating, by the intelligent assistant, an instruction for requesting one of the third-party applications to provide the first potential service;

detecting, by the intelligent assistant, whether a corresponding trigger condition for performing the first potential service, as indicated in the pre-established service relationship model, is met after generating the instruction; and determining, by the intelligent assistant, whether to store the instruction in a cache temporarily or send the instruction to the one of the third-party applications based on whether the corresponding trigger condition is met.

2. The service recommendation method of claim 1, wherein the threshold comprises at least one of a relevance degree or a quantity of recommended services.

3. The service recommendation method of claim 1, wherein the threshold is for a quantity of services recommended to the user, and wherein selecting the first potential service comprises:
ranking the corresponding degrees of relevance of the plurality of services to the first service; and
selecting the first potential service corresponding to a ranking that meets the threshold.

4. The service recommendation method of claim 1, further comprising selecting, from the pre-established service relationship model, a second potential service with a second degree of relevance to the first service that meets the corresponding trigger condition, wherein the first degree of relevance is higher than the second degree of relevance, and wherein recommending the first potential service comprises recommending, according to a ranking of the first degree of relevance and the second degree of relevance, the first potential service.

5. The service recommendation method of claim 1, wherein the pre-established service relationship model further comprises corresponding relevance conditions of the plurality of services, and wherein selecting the first potential service comprises:
determining a first relevance condition based on the request for the first service and an environmental condition of the first request; and
selecting the first potential service when the first relevance condition meets the corresponding trigger condition.

6. The service recommendation method of claim 1, further comprising:
extracting, from the pre-established service relationship model, a first of the corresponding service parameters corresponding to the first service;
extracting, from the pre-established service relationship model, a second of the corresponding service parameters corresponding to the first potential service;
allocating, in a session cache, a first session to the first service;
storing the first service parameter in the first session;
allocating, in the session cache, a second session to the first potential service, wherein the second session comprises the second service parameter; and
storing the second service parameter in the second session, wherein the first session and the second session share values of the first service parameter and the second service parameter.

7. The service recommendation method of claim 1, wherein the first service corresponds to a second service of the plurality of services, and wherein a second degree of relevance between the second service and the first service indicates a probability of requesting the second service.

8. The service recommendation method of claim 1, wherein the service recommendation method is executed by a server on a network side.

9. The service recommendation method of claim 1, wherein the service recommendation method is executed by a terminal.

10. An apparatus with an intelligent assistant, comprising:
a memory comprising instructions; and
a processor coupled to the memory and configured to execute the instructions, which causes the processor to be configured to:
receive a request for a first service by the intelligent assistant;
parse the request for the first service using natural language processing;
extract a service name from the request after parsing the request, wherein the service name indicates a type of the first service;
determine a type of service parameter for the first service based on the service name, wherein the type of service parameter for the first service is recorded in a pre-established service relationship model, wherein the established service relationship model indicates a relationship between two or more services, wherein the pre-established service relationship model comprises a plurality of service names of a plurality of services provided by the intelligent assistant, corresponding degrees of relevance of the plurality of services to the first service, a plurality of corresponding trigger conditions of the plurality of services, and types of service parameters of the plurality of services, wherein each service parameter is a configuration parameter of a third-party application that provides a corresponding service, wherein each service parameter comprises a mandatory parameter and an optional parameter, wherein the mandatory parameter is a parameter that must be received to invoke the first potential service, and wherein the optional parameter is a parameter that is optionally received with the mandatory parameter;
extract a service parameter for the first service from the request based on the type of service parameter indicated in the pre-established service relationship model after parsing the request;

select a first potential service with a first degree of relevance to the first service based on the service name, the service parameter, and the pre-established service relationship model indicating that a degree of relevance between the first potential service and the first service meets a threshold;

generate an instruction for requesting one of the third-party applications to provide the first potential service;

detect whether a corresponding trigger condition for performing the first potential service, as indicated in the pre-established service relationship model, is met after generating the instruction; and determine whether to buffer the instruction in a cache or send the instruction to the one of the third-party applications based on whether the corresponding trigger condition is met.

11. The apparatus of claim 10, wherein the threshold comprises at least one of a relevance degree or a quantity of recommended services.

12. The apparatus of claim 10, wherein the threshold is for a quantity of services recommended to the user, and wherein the processor is further configured to:

rank the corresponding degrees of relevance of the plurality of services to the first service; and select the first potential service corresponding to a ranking that meets the threshold.

13. The apparatus of claim 12, wherein the processor is further configured to:

select, from the pre-established service relationship model, a second potential service with a second degree of relevance to the first service that meets the corresponding trigger condition, wherein the first degree of relevance is higher than the second degree of relevance; and recommend, according to a ranking of the first degree of relevance and the second degree of relevance, the first potential service.

14. The apparatus of claim 13, wherein the pre-established service relationship model further comprises corresponding relevance conditions of the plurality of services, and wherein the processor is further configured to:

determine, a first relevance condition based on the request for the first service and an environmental condition of the first request; and select the first potential service when the first relevance condition meets the corresponding trigger condition.

15. The apparatus of claim 14, wherein the processor is further configured to:

extract, from the pre-established service relationship model, a first of the corresponding service parameters corresponding to the first service;

extract, from the pre-established service relationship model, a second of the corresponding service parameters corresponding to the first potential service;

allocate, in a session cache, a first session to the first service;

store the first service parameter in the first session;

allocate, in the session cache, a second session to the first potential service; and store the second service parameter in the second session, wherein the first session and the second session share values of the first service parameter and the second service parameter.

16. The apparatus of claim 15, wherein the first service corresponds to a second service of the plurality of services, and wherein a second degree of relevance between the second service and the first service indicates a probability of requesting the second service.

17. The apparatus of claim 16, wherein the apparatus is a server on a network side.

18. The apparatus of claim 16, wherein the apparatus is a terminal.

19. The service recommendation method of claim 1, wherein the first potential service is further selected based on a probability of the first potential service being selected by the user.

20. The apparatus of claim 10, wherein the processor is further configured to select the first potential service based on a probability of the first potential service being selected by the user.

* * * * *